Figure 1:
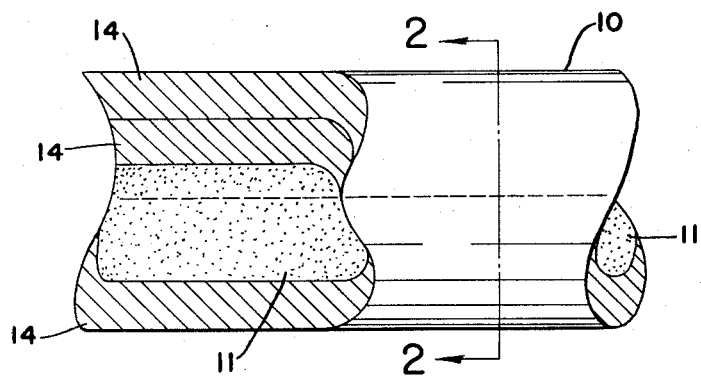

Oct. 20, 1959  G. G. LANDIS ET AL  2,909,650
METHOD AND MEANS FOR BARE ELECTRODE WELDING OF ALLOY STEELS
Filed Nov. 13, 1956

INVENTOR.
GEORGE G. LANDIS &
DONALD M. PATTON
BY
*Alfred C. Body*
ATTORNEY

United States Patent Office 2,909,650
Patented Oct. 20, 1959

2,909,650

METHOD AND MEANS FOR BARE ELECTRODE WELDING OF ALLOY STEELS

George G. Landis, South Euclid, and Donald M. Patton, Willowick, Ohio, assignors to The Lincoln Electric Company, Cleveland, Ohio, a corporation of Ohio Application November 13, 1956, Serial No. 621,565

10 Claims. (Cl. 219—146)

This invention pertains to the art of arc welding and, more particularly, to an electrode for, and a method capable of, depositiing a steel weld bead of any desired alloy content.

The present invention is, in some respects, related to that in co-pending application Serial No. 594,918 filed June 29, 1956 entitled "Means and Method for Bare Electrode Welding" which application describes generally an electrode for welding mild or non-magnetic steels using a bare steel electrode and welding in air.

The present application deals with the use of the principles described in that application for the depositing of steel weld beads of any desired alloy content.

In the depositing of alloy steel weld beads, it has heretofore been conventional to alloy with the steel of the electrode the desired ingredients which must appear in the final weld bead. Such alloy steels are extremely expensive and require careful alloying of the steel while in the molten state and such alloys can only be economically made in relatively large batches. If a plurality of different alloy weld beads must be deposited, it requires the maintenance of a large expensive inventory of different alloy electrode wires.

Efforts have been made, for example in deep flux or submerged arc welding, to place the alloying ingredients in the flux and to employ a mild steel electrode. Some of these fluxes are of the so-called "fused" type, that is, the flux ingredients have been completely melted, allowed to cool and then crushed to size. The alloying ingredients must be added to the flux following this crushing operation. Such alloying ingredients do not remain uniformly mixed throughout the flux but tend to settle out during the handling of the flux before it is put in bags, or during shipment of the flux in bags. Thus, a non-uniform alloying of the weld bead results.

It has further been proposed, as described in application Serial No. 79,298, filed March 2, 1949 now abandoned and Serial No. 291,562, filed June 3, 1952, to place the alloying ingredients with the other fluxing ingredients all in the finely ground condition, add a binder and heat the mixture to a temperature sufficiently only to harden the binder so that the flux ingredients remain in a finely divided and uniformly distributed state but bound into particles of a usable size. The problems of the fused flux are thus overcome. Such a flux is relatively inefficient in the recovery of the alloying ingredients in the weld bead. However, particularly using the later flux, many thousands of feet of successful alloy weld beads have been laid down.

It has also been conventional to place the alloying ingredients in a coating on the outside of a mild steel electrode. Here the recovery efficiency is relatively low and a very substantial amount of the alloying ingredients remain in the slag and are therefore wasted.

It has also been proposed to place alloying ingredients on the inside of a hollow bare steel electrode but with such electrodes it is generally always necessary to provide some externally supplied means for protecting the arc from the atmosphere.

The present invention contemplates a new and improved welding electrode of the general type described which overcomes all the above-referred-to difficulties and others, and provides a bare steel electrode capable of depositing a steel weld bead of any desired alloy content without the use of any externally supplied means for protecting the arc from the atmosphere.

By "bare" electrode is meant an electrode having an external surface which may be readily contacted by electrically energizing means as the electrode is advanced towards the workpiece surface. It is not meant to exclude electrodes having a thin non-metallic coating placed thereon for the purposes of protecting the electrode surface from the atmosphere and which may be readily pierced by electrode energizing means as the electrode is advanced to the workpiece.

By "welding in air" is meant welding without the use of any protective means supplied on the outside of the electrode or supplied to the arc independently of, but simultaneously with, the electrode.

In accordance with the present invention, there is provided an arc welding electrode comprised of a hollow tube of a metal to be deposited having contained in the interior a killing agent, a killing agent protector and one or more of the alloying ingredients which it is desired to have appear in the deposited weld bead. An oxide solvent may also be employed.

The metal to be deposited is an alloy of steel and thus the tube is preferably of a plain low-carbon steel of the cheapest variety. It can, of course, be made of an alloy steel or of one of the alloying ingredients set forth hereinafter, if practicable.

The killing agents are metals having a greater affinity for oxygen than does either iron or carbon, such as hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium, uranium.

Thus, there must always be present one of more killing agents in an amount to perform the functions as set forth in the first above-referred to application, namely of reducing any iron oxide present in the weld bead before it can react with carbon and form carbon monoxide, a gas with a volume many thousands of times greater than the volume of the carbon and the iron oxide from which it is formed. This gas is formed internally of the molten weld bead as the bead is hardening and is trapped therein leaving holes or bubbles throughout the weld bead.

The amount of killing agent required is from ½ to 1% of the total electrode weight.

The amount of alloying ingredient depends on the metal of the tube. For a steel tube the maximum is 50%. For a tube of one of the alloying ingredients, the maximum is 95%. The invention will be described with reference to a steel tube.

With reference to the killing agents, some are extremely rare, are radioactive or are difficult to introduce into the arc or weld pool for various reasons such as, without limitation, a boiling temperature below the melting temperature of steel. They may thus be disregarded from practical aspects of the invention, although if the theories set forth herein are correct, they should work. Of the practical, commercially available killing agents, zirconium, titanium, boron, aluminum and silicon are preferred. With aluminum and silicon, however, usually greater pains must be employed to exclude the atmosphere from the arc by means of the killing agent protector described hereinafter.

Of the killing agents above listed, zirconium, beryllium, titanium, boron, aluminum, silicon, are normally considered as being capable of exerting an alloying effect on steel and when used in amounts greater than that indicated as required to perform the killing agent function, may be considered as alloying ingredients. Such metals will hereinafter be referred to as "alloying killing agents."

Additional alloying ingredients are metals having a greater affinity for oxygen than does iron but less than does carbon, such as manganese, chromium, niobium, tantalum, gallium and vanadium. These metals are de-oxidizers and are referred to jointly hereinafter as "de-oxidizers" or "alloying de-oxidizers."

Still other metals capable of exerting an alloying effect on steel and thus included with the invention are molybdenum, tungsten, antimony, nickel, copper, cobalt, arsenic, tantalum, and columbium. These metals may be introduced either as a pure metal, as a ferro alloy, as alloys of themselves, or as oxides. In the event they are introduced as oxides, however, there must be a proportionally greater amount of a de-oxidizer or a killing agent, or both, which will reduce the oxide in the heat of the arc so that the metal may be available as an alloying ingredient. Such metals, their alloys or oxides will be referred to hereinafter as "other alloying ingredients" when it is desired to distinguish them from the "alloying killing agent ingredients" or the "alloying deoxidizer ingredients."

Carbon is also capable of exerting an alloying effect on steel and is included as an alloying incredient herein. Carbon, if included, should be introduced either in the elemental form, such as graphite, or as a carbide of iron or the other alloying ingredients above listed.

With reference to the other alloying ingredients employed, it is to be noted that they have a lesser affinity for oxygen than does either carbon or iron, and thus are unable to perform either a killing agent or deoxidizer function. If these metals or deoxidizers only are to be deposited, they must always be employed in conjunction with a killing agent. Also, if these metals are to be added in the form of an oxide, the amount of killing agent or deoxidizer must be proportionately increased so that the oxide of the metal will be reduced in the heat of the arc and the metal remaining can then be present in the weld bead as an alloying ingredient.

The killing agent protector as described in the first above-referred-to application must be (1) inert to both oxygen and nitrogen, (2) capable of wetting molten metals, and (3) have a boiling temperature either just below or preferably just above the melting temperature of steel. The functions of such a killing agent protector are described in the first above-referred-to application. Generally, it may be said that the killing agent protectors are selected from the class of the halides of the alkali and alkaline earth metals having a boiling temperature either above or just below the melting temperature of steel, aluminum fluoride, and materials capable of breaking down or combining in the heat of the arc to provide such halides.

The oxide solvents are also set forth in the first above-referred-to application and while silicon dioxide is preferred, it is believed that aluminum oxide, titanium dioxide and zirconium oxide can be also substituted satisfactorily for the silicon dioxide. Furthermore, it is believed that the oxides of the elements of the class $R_2O_3$, $RO_2$ and the $R_2O_5$ elements as indicated in the periodic chart of the elements can also be substituted satisfactorily providing that the oxide has a boiling temperature of at least approximately 1500° C., that is the melting temperature of steel. As the silicon dioxide is relatively cheap and performs satisfactorily, it is preferred.

The amounts of killing agent protector employed and of oxide solvent employed are generally as set forth in the first above-referred-to application, the minimum amount varying from 1% to 3% when no oxide solvent is employed and from ¾% to 2% when the oxide solvent is employed.

The oxide solvent should be present in amount of from ¼% to 3%.

Generally, the maximum amount of killing agent protector and oxide solvent is 10% of the total weight of the materials fed into the arc with the electrode. In amounts above this, weld spatter results.

In determining the amount of alloying ingredients to be employed, the amount of loss of the ingredients in passing through the arc to the weld bead must be taken into account. Generally, the loss will be greatest with metals having a high affinity for oxygen and less with those having a low affinity for oxygen. Normally, the recovery of the "alloying killing agent ingredients" in the weld bead may be considered as approximately 50%. The recovery for the "alloying deoxidizer ingredients" is 80% and the recovery for the other alloying ingredients and carbon above discussed is 100%.

Further, in determining the amount of alloying ingredients to employ, the alloy content of the parent metal of the workpiece must be taken into account. Approximately 50% of the deposited weld bead will be made up of the parent metal and 50% will be coming from the electrode. Thus, if an alloy content higher than the parent metal is to be obtained, greater amounts of alloying ingredients must be employed than if the alloy content of the weld bead is to be the same as the parent metal. In this latter case, the ratio of the deposited metal to the parent metal must also be taken into account.

It is preferred that in all events the metallic content of the material on the inside of the electrode be at least 10% and in the event that the amount of alloying ingredients are not of this amount, then the balance should be made up in the form of powdered iron.

The various alloying ingredients are preferably added in the form of alloys and particularly ferro alloys or alloys of themselves, for example, where both silicon and titanium are to be added, as a silico-titanium alloy. However, they may be added in whole, or in part, in elemental form or as alloys of the iron powder or as alloys of the steel of the electrode.

It is to be noted that alloys of these alloying ingredients are generally much cheaper than the pure metal and appear to enter into the chemical reaction of the weld much more readily. Thus, aluminum is better added as a ferro alloy.

The various alloys may contain variable percentages of the desired alloying ingredients. In the examples to be given hereinafter, the amount of the alloy most commonly available and the cheapest is given. Alloys containing different percentages of the alloying ingredients may be substituted interchangeably providing the amount of the alloy employed is adjusted to correspond to the amount of the desired alloying ingredient contained therein. It is to be noted that in all instances, the iron of the ferro alloys enters into and becomes part of the weld metal.

In general, it may be stated that the present invention primarily increases the amount of the alloying killing agents and deoxidizers of the above-referred-to application together with providing for the addition of other alloying ingredients not mentioned therein in such amounts as will provide for the desired weld bead.

The principal object of the invention is the provision of a new and improved electrode for electric arc welding which enables the depositing of a weld bead of any desired alloy content.

Another object of the invention is the provision of a new and improved method and electrode for electric arc welding which does not require the use of a coating on the outside of the electrode nor granular flux in the weld bead, nor an insert shielding gas and which will deposit a weld bead of any desired alloy content.

Still another object of the invention is the provision of a new and improved arrangement for depositing an alloy steel weld bead in air.

Still another object of the invention is the provision of a new and improved electrode which can be used in automatic continuous welding and deposit alloy weld bead of any desired content which includes a hollow tube of mild steel filled with the desired alloying ingredients, together with other materials which will protect the arc from the atmosphere and enable weld beads to be obtained in air.

Figure 2:
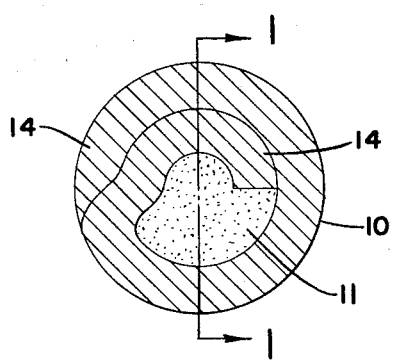

The invention may take physical form in certain steps and combination of steps and certain electrode constructions and materials to be used therewith, all differing in appearance and arrangement one from the other. Preferred embodiments of the invention will be described in detail in this specification and illustrated in the accompanying drawing which is a part hereof and wherein:

Figure 1 is an enlarged side elevational view with portions broken away of an arc welding electrode embodying the present invention, Figure 2 is a cross-sectional view of Figure 1 taken approximately in line 2—2 thereof.

Referring now to the drawings wherein the showings are for the purpose of illustrating a preferred embodiment of the invention only, and not for the purposes of limiting same, the figures show a welding electrode comprised of an elongated metallic member 10 having an interior space filled with materials 11 compounded in accordance with the present invention.

The member 10 is preferably in the form of a tube having a single continuous interior passage, although obviously a plurality of passages could be provided. The member 10 is preferably formed from a strip of flat material formed in the shape of a tube with the edges overlapping as at 14, 15. Obviously, the member 10 could be a seamless tube or the edges could abut if desired. The edges need not be welded although they could be.

The member 10 is preferably formed of ordinary low-carbon, low-alloy steel of the cheapest kind.

Specific examples of the preferred composition of the material 11 expressed as a percentage of the weight of the completed electrode are as follows:

| Example | 1 | 2 | 3 |
| --- | --- | --- | --- |
| | Percent | Percent | Percent |
| Nickel | 8 | 8 | 12 |
| Ferro chrome (67-72% Cr) | 25 | 25 | 36 |
| Ferro niobium or ferro columbium (50-60% Nb) | 1 | 1 | 1 |
| Sodium fluoride | 2 | 2 | 2 |
| Potassium silico fluoride | 1 | 5 | 1 |
| Silicon dioxide | 1 | | 1 |
| Ferro titanium (40% Ti) | 1 | 1 | 1 |
| Iron powder | 15 | | |
| Balance | (1) | (1) | (1) |
| Bead analysis (all weld metal): | | | |
| Chromium | 16.90 | 18.10 | 23.0 |
| Nickel | 8.67 | 8.85 | 11.0 |

[1] Electrode metal.

The above-referred-to ingredients with the exception of the electrode metal are all preferably finely ground, thoroughly intermixed and placed on the interior of the hollow steel tube. Alternatively, the alloying ingredient (and possibly the iron powder and silicon dioxide) may be intermixed with the halide and the mixture brought to a temperature where the halide melts. Thereafter the molten mixture is allowed to cool and after cooling, is crushed to a fine particle size. This crushed mixture and the other ingredients are then mixed.

These ingredients are deposited upon a strip of steel which will form the member 10, in such amounts so that when the strip is formed into the tube, the ingredients will be present in the desired percentages above indicated. The rate of deposition of the powdered ingredients may be carefully controlled in relation to the rate of movement of the strip past the mechanism depositing the ingredients to provide a desired amount; or alternatively, an excessive amount of ingredients may be deposited on the strip and scraper means employed for the purpose of removing the excess.

The strip may, prior to the depositing of the powdered ingredients, be partly formed into a U-shape so as to better receive the ingredients. The strip may then be formed into a hollow tube by conventional methods with the edges either abutting or overlapping as shown. Thereafter, the formed hollow tube is passed through a sizing die which reduces the external diameter of the tube and, at the same time, compacts the powdered ingredients so that they will not separate or settle out and so that, in the event the end of the tube is opened, the material will not fall out. Obviously, to eliminate the possibility of any ingredients falling out, it is preferred that when the tube is cut to lengths that a pinching action be employed which will close both ends of the tube formed by the cut.

It is to be noted, however, that if the ingredients cannot be compacted during the course of manufacture, it is possible to heat the metal of the member 10 to a temperature sufficient to fuse the halide, or use some other binding ingredient such as pitch so that all of the ingredients will be held in place within the interior of the member 10.

When a welding operation is completed, a metallic bead will be formed on the end of the electrode which will close over the end of the tube; or alternatively, the ingredients will have been melted back a distance from the end of the tube and, as these ingredients harden, the end of the tube will thus be sealed.

The electrode may be of any desired diameter, usable in electric arc welding from 1/16 of an inch to 1/4 of an inch and larger. The smaller sizes are more flexible, easily handled, and are preferred. The smaller sizes indicated, however, must be formulated from extremely thin strips of metal and are thus somewhat difficult to handle during manufacture of the electrode. An electrode diameter of between the 3/32 and 1/8 of an inch has been found quite satisfactory in practice.

In accordance with the invention, the cross-sectional area of the interior of the member 10 is from 25% to 75% of the total electrode area. The minimum size of the opening must be that required to accept an amount of material 11 to properly function during the welding operation. From a practical standpoint, it is extremely difficult to form a tube by the methods above described having an interior opening of a smaller area than the minimum indicated. If the desired ingredients do not fill the minimum area, iron powder may be added. The use of the iron powder enables the bulk of the material 11 to be increased in an amount such that the interior of the member 10 will be entirely filled. Further, such iron powder with the other metals is electrically conductive and as it melts, it helps to bridge over the open end of the member 10 so that the hollow electrode is presented to the arc as though it were a solid electrode. This is important in eliminating spatter and the like.

The use of powdered iron in amounts in excess of 10% is in accordance with certain aspects of the invention. Such powdered iron serves as a diluent for the other ingredients, makes proportioning of these ingredients in relation to the weight of the electrode metal more easily carried out in the course of manufacture and enables the internal area of the member 10 to be as large as indicated while still compacting all of the powdered ingredients into a solid compact body.

While various dimensions of the member 10 may be employed in accordance with the invention, preferred embodiments are as follows:

| Final outer diameter, inches | Strip width, inches | Thickness, inches |
|---|---|---|
| .175 | .520 | .032 |
| .161 | .540 | .026 |
| .135 | .506 | .021 |
| .128 | .506 | .017 |

It is also to be noted that the welding is preferably conducted at relatively high lineal speeds. In this way, the deposited weld bead congeals rapidly and as small amount of time as possible exists for the undesirable chemical reactions above-referred to take place.

It is further to be noted that the welding is preferably conducted at relatively high welding currents for a given electrode diameter. Thus, the welding is conducted at a current such that the metal from the electrode is projected from the electrode end into the molten weld bead in the form of a fine spray rather than in the form of large droplets. This effect occurs when the currents are increased to amounts such that the arc exerts a pinching effect on the end of the electrode, forcing the molten metal off of the electrode as fast as it forms. The critical current, at which this effect commences to occur, varies depending upon a number of factors, but particularly on the de-ionizing effect of the gas surrounding the electrode end. Argon has a minimum de-ionizing effect and the critical current at which the pinching effect occurs is lower than if the welding were in air or if carbon dioxide gas were used as the shielding medium. In fact, with carbon dioxide gas, the currents are excessively high. However, with the present invention the various halides are in the form of a gas surrounding the electrode end and particularly with the fluorides of potassium it appears that they have a minimum de-ionizing effect on the arc and that the critical currents at which the spray transfer of metal from the electrode end of the weld pool occurs is not unduly high. It is believed that the halides of cesium, rubidium, and barium will have a similar effect.

This pinching effect, of course, occurs either in a mild steel electrode as is described in application Serial No. 594,918, or with an electrode constructed and arranged on accordance with the invention described in this application. Thus potassium fluoride is far superior as a protector than is calcium fluoride.

The electrode end and the ingredients on the inside thereof all melt generally simultaneously. Droplets continuously form on the end of the member 10. These droplets are a mixture of the molten metal of the member 10 and the molten ingredients 11. The de-oxidizer and killing agent mix readily with the metal of the member 10. The killing agent protector and iron oxide solvent do not mix with these metals and being of a lesser density flow to the outside where they coat the molten droplet. In coating the droplet, they protect the metals of the droplet from the atmosphere. Also, the oxide solvent and killing agent protector dissolve any iron oxide which might have formed on the surface of the droplet as it was melting. The surface of these droplets is brought rapidly to the boiling temperature and some of the killing agent protector and iron oxide solvent, together with some of the metals in the droplets are boiled away. The vapors formed move outwardly and condenser as they reach the isothermal temperature zone corresponding to their condensing temperature. The outwardly moving vapors and the liquid particles formed thus serve to help keep the oxygen and nitrogen of the air away from the droplets. It is also to be noted that the iron oxide solvent and killing agent protector in dissolving the iron oxide have lowered the surface tension of the materials on the surface of the droplet and smaller droplets of molten metal thus result which move from the electrode end through the arc to the molten weld pool.

The de-oxidizer, when it reaches the molten weld pool, immediately reacts with any iron oxide found to reduce the iron oxide to molten iron and an oxide of the de-oxidizer. This oxide is insoluble in the molten iron and floats to the top. The killing agent also reacts with any iron oxide present to reduce such iron oxide to pure iron and an oxide of the killing agent. These oxides are all either solids or liquids at the melting temperature of iron and float to the top thereof where they can be removed as a slag. It is to be noted that the de-oxidizer in the form of an oxide is a solid and does not readily give up its oxygen to any carbon in the steel and thus carbon monoxide is not formed. It is also to be noted that the killing agent has a greater affinity for oxygen than does carbon so that no reaction occurs between any oxide of the killing agent and the carbon in the molten weld metal. The alloying ingredients, less a slight loss, turn up as alloying ingredients in the deposited weld bead.

In the preferred embodiments above described, the member 10 is bare. By "bare," however, it is not meant to exclude electrodes having thin, non-metallic coatings which can readily be pierced by conventional electrode energizing means.

Using the present invention and in particular using the killing agent protectors, substantial decreases have been obtained in the loss of the de-oxidizer and killing agent in moving across the arc to the molten weld pool. The invention is believed to have broader applications than simply to hollow tube electrodes as described with reference to the preferred embodiment.

Using the present invention, solid non-porous weld beads have been obtained while welding directly in air, that is, without any other external means for protecting the arc from the atmosphere. The invention does not, however, exclude the use of other protective means for the arc such as the inert gases, carbon dioxide, metallic vapors, or if desired, conventional electrode coatings on the outside of the electrode.

It will be appreciated that the electrode, even as described in the preferred embodiment, can be used in hand welding if desired.

The invention has been described with reference to preferred embodiments. Obviously, modifications and alterations will occur to others upon a reading and understanding of this specification and it is my intention to include all such modifications insofar as they come within the scope of the appended claims or their equivalents.

In the claims, whenever a percentage is indicated, such percentage is a percentage of the total amount of ingredients being fed into the arc in any given unit of time, or a percentage of the total electrode weight.

Having thus described our invention, we claim:

1. An arc welding electrode comprised of a hollow steel tube having an interior filled with one or more killing agents selected from the class consisting of zirconium, titanium, boron, aluminum, and silicon in amounts of from ½ to 1%, one or more killing agent protectors selected from the class consisting of the halides of the alkali and the alkaline earth metals having a boiling temperature close to melting temperature of steel in amounts in excess of ¾%, one or more oxide solvents selected from the class consisting of the oxides of silicon, aluminum, zirconium, and titanium in amounts in excess of ¼%, the total of the killing agent protectors and oxide solvents being less than 10%, and an alloying ingredient in amounts of 1 to 50% selected from the class consisting of zirconium, beryllium, titanium, boron, aluminum, silicon, manganese, chromium, niobium, tantalum, gallium, vanadium, molybdenum, tungsten, antimony, nickel, copper, cobalt, arsenic, and columbium, either as metals, ferro alloys, or alloys of themselves.

2. An arc welding electrode comprised of approximately the following composition: nickel 8%; ferro chrome (67–72% Cr) 25%; ferro niobium or ferro columbium (50–60% Nb) 1%; sodium fluoride 2%; potassium silico fluoride 1%; silicon dioxide 1%; ferro titanium (40% Ti) 1%; iron powder 15%; electrode metal (steel) 56%, the electrode metal being in the form of a tube and the other materials of the composition being contained inside of said tube.

3. An arc welding electrode comprised of approximately the following composition: nickel 8%; ferro chrome (67–72% Cr) 25% ferro niobium or ferro columbium (50–60% Nb) 1%; sodium fluoride 2%; potassium silico fluoride 5%; ferro titanium (40% Ti) 1%; electrode metal (steel) 58%, the electrode metal being in the form of a tube and the other materials of the composition being contained inside of said tube.

4. An arc welding electrode comprised of approximately the following composition: nickel 12%; ferro chrome (67–72% Cr) 36%; ferro niobium or ferro columbium (50–60% Nb) 1%; sodium fluoride 2%; potassium silico fluoride 1%; silicon dioxide 1%; ferro titanium (40% Ti) 1%; electrode metal (steel) 46%, the electrode metal being in the form of a tube and the other materials of the composition being contained inside of said tube.

5. An arc welding electrode capable of depositing an alloy steel weld bead comprised of a hollow tube of steel and having on the inside thereof: from ½ to 1% of one or more killing agents selected from the class consisting of hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium, uranium; and from 1 to 60% of one or more alloying ingredients selected from the class consisting of zirconium, beryllium, titanium, boron, aluminum, silicon, manganese, chromium, niobium, tantalum, gallium, vanadium, molybdenum, tungsten, antimony, nickel, copper, cobalt, arsenic, columbium, and carbon, all either as a pure metal, a ferro alloy or as alloys of themselves; and one or more killing agent protectors selected from the class consisting of the halides of the alkali and alkaline earth metals, and aluminum fluoride in amounts of from 1 to 10%.

6. An arc welding electrode comprised of a hollow steel tube having contained on the inside thereof: from ½ to 1% of one or more killing agents selected from the class consisting of hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium, and uranium; in excess of ¾% of one or more killing agent protectors selected from the class consisting of the halides of the alkali and alkaline earth metals and aluminum fluoride; one or more oxide solvents in minimum amounts of ¼% selected from the class consisting of the oxides of the elements of the class $R_2O_3$, $RO_2$, and the $R_2O_5$ elements, as indicated in the periodic chart of the elements; the total of the killing agent protectors and oxide solvents being less than 10%; and one or more alloying ingredients in amounts of from 1 to 50% selected from the class consisting of zirconium, beryllium, titanium, boron, aluminum, silicon, manganese, chromium, niobium, tantalum, gallium, vanadium, molybdenum, tungsten, antimony, nickel, copper, cobalt, arsenic, columbium, and carbon, all either as metals, ferro alloys or alloys of themselves.

7. An arc welding electrode comprised of a hollow tube of steel containing in the interior thereof: one or more killing agents in amounts of from ½ to 1% selected from the class consisting of hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium, and uranium; one or more killing agent protectors in amounts of from ¾–10% selected from the class consisting of the halides of the alkali and alkaline earth metals, aluminum fluoride, or materials capable of breaking down or combining in the heat of the arc to form such halides; one or more alloying ingredients in total amounts of from 1–50% selected from the class consisting of zirconium, beryllium, titanium, boron, aluminum, silicon, manganese, chromium, niobium, tantalum, gallium, and vanadium either as metals, ferro alloys or alloys of themselves, and molybdenum, tungsten, antimony, nickel, copper, cobalt, arsenic, tantalum, and columbium, all either as pure metals, ferro alloys, alloys of themselves or as oxides, and carbon either in elemental form or as a carbide of iron or the other alloying ingredients.

8. The combination of claim 7 wherein the materials on the inside of said tube also include one or more oxide solvents selected from the class consisting of the $R_2O_3$, $RO_2$ and the $R_2O_5$ elements, as indicated in the periodic chart of the elements, having a boiling temperature at least above 1500° C. in amounts in excess of ¼%, the total amounts of the oxide solvents and killing agent protectors being less than 10%.

9. An arc welding electrode comprised of a hollow tube of steel containing on the interior thereof: one or more killing agents in amounts of from ½ to 1% selected from the class consisting of hafnium, lanthanum, the metals of the lanthanide series, zirconium, yttrium, scandium, beryllium, titanium, boron, aluminum, silicon, barium, calcium, magnesium, strontium, thorium, actinium, lithium, neptunium, plutonium, radium and uranium; one or more killing agent protectors in amounts of from ¾ to 10% selected from the class consisting of the fluorides of lithium, sodium, calcium, barium, potassium, and aluminum, the chlorides of magnesium, sodium, calcium, lithium; and one or more alloying ingredients in total amounts of from 1 to 50% selected from the class consisting of zirconium, beryllium, titanium, boron, aluminum, silicon, manganese, chromium, niobium, tantalum, gallium, vanadium, molybdenum, tungsten, antimony, nickel, copper, cobalt, arsenic, and columbium, all either as pure metals, ferro alloys, alloys of themselves or as oxides, and carbon either in elemental form or as a carbide of iron or the other alloying ingredients.

10. The combination of claim 9 wherein the materials on the inside of said tube also include one or more oxide solvents selected from the class consisting of the oxides of silicon, titanium, aluminum and zirconium in amounts in excess of ¼%, the total of the killing agent protectors and oxide solvents being less than 10%.

References Cited in the file of this patent

UNITED STATES PATENTS

| | | |
|---|---|---|
| 1,501,266 | Brace | July 15, 1924 |
| 1,942,364 | Rood | Jan. 2, 1934 |
| 2,408,620 | Friedlander | Oct. 1, 1946 |
| 2,435,800 | Sawhill | Feb. 10, 1948 |
| 2,442,087 | Kennedy | May 25, 1948 |
| 2,642,516 | Avery | June 16, 1953 |
| 2,785,285 | Bernard | Mar. 12, 1957 |
| 2,817,751 | Phillips | Dec. 24, 1957 |